United States Patent
Nakata

(10) Patent No.: US 9,186,937 B2
(45) Date of Patent: Nov. 17, 2015

(54) PNEUMATIC TIRE

(75) Inventor: Yoshiki Nakata, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 252 days.

(21) Appl. No.: 13/989,264

(22) PCT Filed: Jan. 19, 2012

(86) PCT No.: PCT/JP2012/000323
§ 371 (c)(1),
(2), (4) Date: May 23, 2013

(87) PCT Pub. No.: WO2012/098895
PCT Pub. Date: Jul. 26, 2012

(65) Prior Publication Data
US 2013/0248068 A1    Sep. 26, 2013

(30) Foreign Application Priority Data
Jan. 19, 2011  (JP) .................. 2011-009086

(51) Int. Cl.
*B60C 11/13*  (2006.01)
*B60C 11/03*  (2006.01)
*B60C 11/12*  (2006.01)

(52) U.S. Cl.
CPC ......... *B60C 11/1307* (2013.04); *B60C 11/0306* (2013.04); *B60C 11/0309* (2013.04);
(Continued)

(58) Field of Classification Search
CPC ............... B60C 2011/0348; B60C 2011/0353; B60C 11/1307; B60C 11/1315; B60C 11/1323; B60C 11/1392; B60C 11/0309
See application file for complete search history.

(56) References Cited

U.S. PATENT DOCUMENTS 5,733,393 A * 3/1998 Hubbell et al. ............ 152/209.5
7,422,043 B2 * 9/2008 Miyazaki ................. 152/209.22
(Continued)

FOREIGN PATENT DOCUMENTS

CN    1354718 A    6/2002
CN    1642759 A    7/2005
(Continued)

OTHER PUBLICATIONS

International Search Report of PCT/JP2012/000323 dated Apr. 17, 2012.
(Continued)

*Primary Examiner* — Steven D Maki
*Assistant Examiner* — Robert Dye
(74) *Attorney, Agent, or Firm* — Sughrue Mion, PLLC

(57) ABSTRACT

On the surface of a tread portion (1), one central main groove (2) extends in a tire circumferential direction (C) at a pattern center, and a pair of outer main grooves (4a, 4b) extend in the tire circumferential direction (C) each at a position between the central main groove (2) and a respective one of two tread ends (3a, 3b). The central main groove (2) and the outer main grooves (4a, 4b) define central land portions (5a, 5b), and the outer main grooves (4a, 4b) and the tread ends (3a, 3b) define outer land portions (6a, 6b). Among the central land portions (5a, 5b) and the outer land portions (6a, 6b), first circumferential narrow grooves (7a, 7b) are provided only in the central land portions (5a, 5b), extend in the tire circumferential direction (C), have a narrower opening width and a shallower depth than those of the central main groove (2), and have a first groove wall (8) on the side of the outer main groove (4a, 4b) and a second groove wall (9) on the side of the central main groove (2) such that an intersection angle (θ1) between a tread surface (10) and the first groove wall (8) is larger than an intersection angle (θ2) between the tread surface (10) and the second groove wall (9).

4 Claims, 3 Drawing Sheets

(52) U.S. Cl.
CPC ......... *B60C11/1323* (2013.04); *B60C 11/1392*
(2013.04); *B60C 11/12* (2013.01); *B60C*
*11/1315* (2013.04); *B60C 2011/0344* (2013.04);
*B60C 2011/0348* (2013.04); *B60C 2011/0353*
(2013.04); *B60C 2011/0372* (2013.04); *B60C*
*2011/0395* (2013.04); *B60C 2011/1209*
(2013.04)

(56) References Cited

U.S. PATENT DOCUMENTS

| | | | |
|---|---|---|---|
| 2008/0236714 A1* | 10/2008 | Kojima | 152/209.9 |
| 2009/0178745 A1 | 7/2009 | Ikegami | |
| 2010/0096053 A1 | 4/2010 | Nagai et al. | |
| 2010/0236680 A1* | 9/2010 | Mukai | 152/209.16 |
| 2010/0243120 A1 | 9/2010 | Kiwaki | |

FOREIGN PATENT DOCUMENTS

| | | | |
|---|---|---|---|
| CN | 101462471 A | | 6/2009 |
| CN | 101578186 A | | 11/2009 |
| CN | 101600586 A | | 12/2009 |
| CN | 101827716 A | | 9/2010 |
| EP | 0547019 A1 | | 6/1993 |
| EP | 2127908 A1 | | 12/2009 |
| JP | 04-143105 | * | 5/1992 |
| JP | 4133804 A | | 5/1992 |
| JP | 09-039515 | * | 2/1997 |
| JP | 9132008 A | | 5/1997 |
| JP | 2008-37139 A | | 2/2008 |
| JP | 2008-201153 A | | 9/2008 |
| JP | 2009-101740 A | | 5/2009 |
| JP | 2009-166592 A | | 7/2009 |
| JP | 2009214759 A | | 9/2009 |
| JP | 2009-298262 A | | 12/2009 |
| JP | 2010228467 A | | 10/2010 |

OTHER PUBLICATIONS

Communication dated Jan. 23, 2015, issued by the European Patent Office in counterpart Application No. 12736321.6.
Communication dated Feb. 25, 2015 from the State Intellectual Property Office of People's Republic of China in counterpart Application No. 201280004277.0.

* cited by examiner

Lateral main groove side ← → Central main groove side

I–I cross-sectional diagram

II–II cross-sectional diagram

PNEUMATIC TIRE

CROSS REFERENCE TO RELATED APPLICATIONS

This application is a National Stage of International Application No. PCT/JP2012/000323, filed on Jan. 19, 2012, which claims priority from Japanese Patent Application No. 2011-009086, filed on Jan. 19, 2011, the contents of all of which are incorporated herein by reference in their entirety.

TECHNICAL FIELD

The present invention relates to a pneumatic tire that has excellent on-snow performance while maintaining good steering stability on a dry road surface.

BACKGROUND ART

Pneumatic tires of course require sufficient steering stability on a dry road surface. Depending on the season and changes in the weather, however, such tires may also be driven on a snowy road surface and thus require on-snow performance as well.

One effective method for improving steering stability on a dry road surface is, for example, to increase the tire ground contact area of the tread surface that contacts the road surface, thereby increasing the rigidity of the land portions in the entire tread.

On the other hand, one effective method for improving on-snow performance is to set a high negative ratio by, for example, increasing the number of tread grooves formed on the tread surface or increasing the groove width of the tread grooves, thereby making it easier for snow to enter the tread grooves. Snow in the grooves is then packed during tire ground contact so as to be compressed into a snow column, resulting in the tire gripping the snowy road surface firmly without slipping.

For this reason, there is generally a tradeoff between steering stability on a dry road surface and on-snow performance.

Patent Literature 1, previously submitted by the present applicant, is an example of a conventional pneumatic tire developed to achieve a balance between steering stability on a dry road surface and on-snow performance.

The pneumatic tire disclosed in Patent Literature 1 is a pneumatic tire having, on the tread surface portion, a plurality of circumferential main grooves extending in the tire circumferential direction and a plurality of land portion rows defined by the circumferential main grooves. In at least one of the plurality of land portion rows, a circumferential auxiliary groove is formed extending in the tire circumferential direction at a location other than the tire equator. The circumferential auxiliary groove has a narrower width and a shallower depth than those of the circumferential main grooves. Of the two side faces defined by this circumferential auxiliary groove, the side face on the tire equator side extends along the normal direction of the tread surface portion or is inclined to the tire equator side by 5° or less with respect to the normal direction. The other side face on the side opposite the tire equator side is inclined to the side opposite the tire equator side by 10° to 30° with respect to the normal direction. This structure improves turning performance on snowy roads without decreasing steering stability or quietness when driving on a dry road surface.

The applicant subsequently examined how to achieve both steering stability on a dry road surface and on-snow performance to an even greater degree and discovered the following. In the tire of Patent Literature 1, the circumferential auxiliary groove needs to be provided in at least one of the central land portion and a outer land portion. Therefore, the circumferential auxiliary groove may be provided in the outer land portion. In this case, although the relationship with the tire ground contact width is a factor, there is a high probability that the circumferential auxiliary groove provided in one of the outer land portions will be outside the tire ground contact region when turning on a snowy road surface. In such a case, if the other side face of the circumferential auxiliary groove on the side opposite the tire equator side is inclined to the side opposite the tire equator side by 10° to 30° with respect to the normal direction, snow cannot be sufficiently drawn into the circumferential auxiliary groove and formed into a snow column, leading to the risk of slipping and also reducing the steering stability due to a reduction in the tire ground contact area when driving straight on a dry road surface. In particular when the tires are mounted on the front and rear wheels and the tire applied load differs between the front and rear tires, for example when the tire applied load is higher on the front tires than on the rear tires, the circumferential auxiliary grooves on the front tires are within the tire ground contact region whereas the circumferential auxiliary grooves on the rear tires are outside of the tire ground contact region. As a result, a difference in grip on a snowy road surface occurs between the front and rear tires, which worsens the front and rear balance and makes the above tendency to slip when turning on a snowy road surface pronounced.

CITATION LIST

Patent Literature

PTL 1: JP2008201153A

SUMMARY OF INVENTION

It is an object of the present invention to provide a pneumatic tire that has excellent on-snow performance while maintaining good steering stability on a dry road surface by providing optimized first circumferential narrow grooves only in central land portions.

In order to achieve the above object, a pneumatic tire according to the present invention comprises, on a tread surface, one central main groove extending in a tire circumferential direction at a pattern center and a pair of outer main grooves extending in the tire circumferential direction each at a position between the central main groove and a respective tread end, the central main groove and the outer main grooves defining central land portions, and the outer main grooves and the respective tread ends defining outer land portions, wherein among the central land portions and the outer land portions, a first circumferential narrow groove is provided only in the each of the central land portions, extending in the tire circumferential direction, having a narrower opening width and a shallower groove depth than those of the central main groove, and having a first groove wall on the outer main groove side and a second groove wall on the central main groove side such that an intersection angle between the tread surface and the first groove wall is larger than an intersection angle between the tread surface and the second groove wall.

The intersection angle between the tread surface and the first groove wall is preferably formed by the tread surface and a chamfered cutout portion provided at an opening edge of the first groove wall.

Additionally, a second circumferential narrow groove is preferably provided in each of the outer land portions, extending in the tire circumferential direction, having a narrower opening width and a shallower groove depth than those the outer main grooves, and having a third groove wall on the outer main groove side and a fourth groove wall on the central main groove side such that respective intersection angles between the tread surface and each of the third groove wall and the fourth groove wall are equivalent.

According to the present invention, it is possible to provide a pneumatic tire that has excellent on-snow performance while maintaining good steering stability on a dry road surface by providing optimized first circumferential narrow grooves only in central land portions.

BRIEF DESCRIPTION OF DRAWINGS

The present invention will be further described below with reference to the accompanying drawings, wherein.

DESCRIPTION OF EMBODIMENTS

Next, embodiments of the present invention are described with reference to the drawings.

Figure 1:
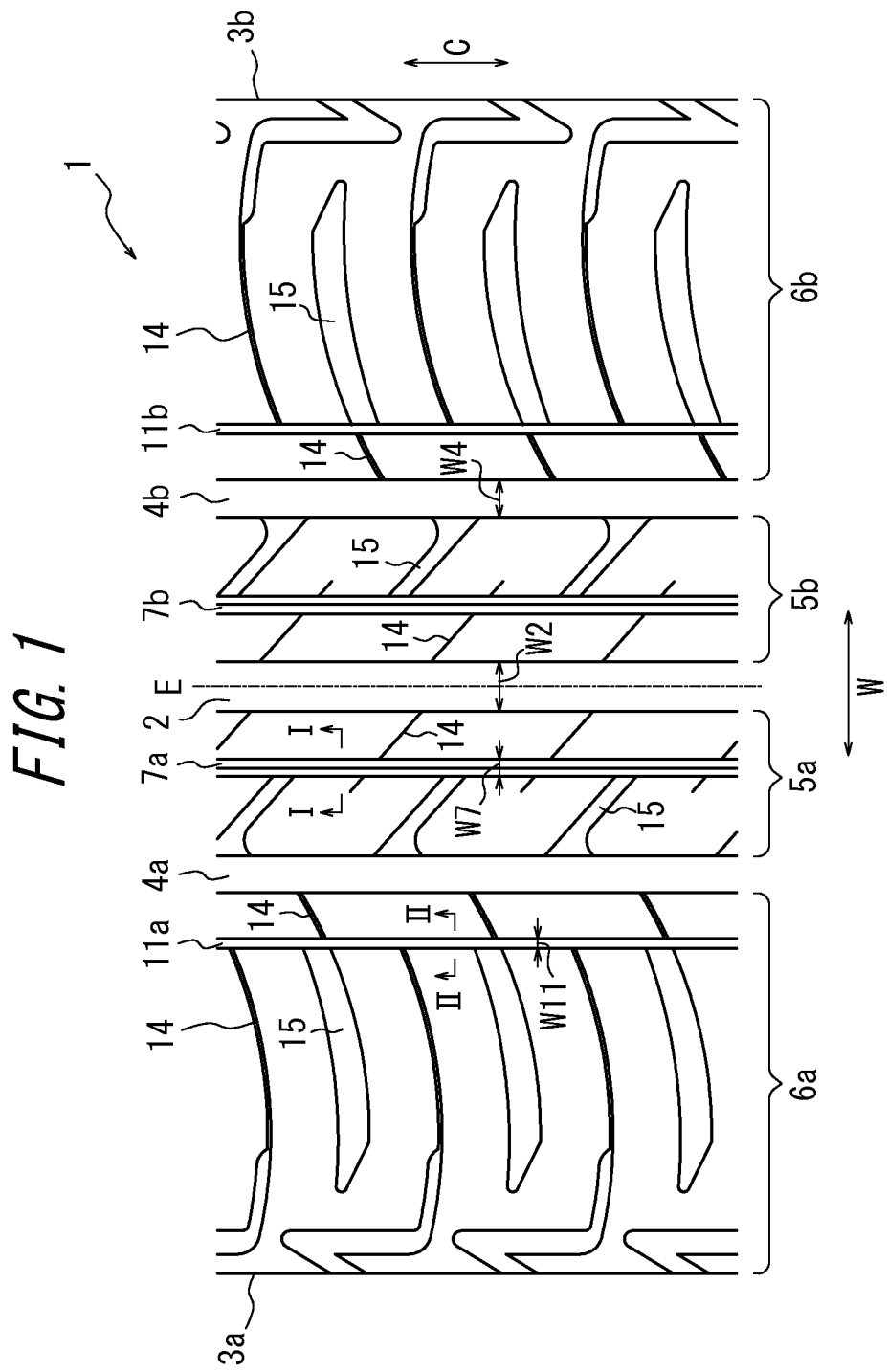
FIG. 1 is a development view of a portion of the tread of a pneumatic tire according to the present invention.

FIG. 1 illustrates a portion of the tread (tread pattern) of a pneumatic tire according to the present invention.

A pneumatic tire having the tread portion 1 illustrated in FIG. 1 includes, on a surface of the tread portion 1, one central main groove 2 extending in the tire circumferential direction C at a pattern center and a pair of outer main grooves 4a and 4b extending in the tire circumferential direction C each at a position between the central main groove 2 and a respective one of two tread ends 3a and 3b. The central main groove 2 and the outer main grooves 4a and 4b define central land portions 5a and 5b, and the outer main grooves 4a and 4b and the tread ends 3a and 3b define outer land portions 6a and 6b. Note that the term "pattern center" as used herein refers to the center of the pattern when the tread pattern is designed. FIG. 1 shows the pattern center coinciding with the tire equator E, but the pattern center may be shifted from the tire equator E in the tire width direction within a region of 60% of the tread width centering on the tire equator E.

The main structural features of the present invention are that optimized first circumferential narrow grooves 7a and 7b are provided only in the central land portions 5a and 5b. In greater detail, among the central land portions 5a and 5b and the outer land portions 6a and 6b, the first circumferential narrow grooves 7a and 7b are provided only in the central land portions 5a and 5b, extend in the tire circumferential direction C, have a narrower opening width and a shallower groove depth than those of the central main groove 2, and have a first groove wall 8 on the side of the outer main groove 4a or 4b and a second groove wall 9 on the side of the central main groove 2 such that an intersection angle $\theta 1$ between the tread surface 10 and the first groove wall 8 is larger than an intersection angle $\theta 2$ between the tread surface 10 and the second groove wall 9. Adopting this structure improves on-snow performance while maintaining good steering stability on a dry road surface.

The following describes the reason, in the present invention, for providing the first circumferential narrow grooves 7a and 7b, in which the groove walls 8 and 9 are non-symmetric in a cross-sectional view of the grooves, in only the central land portions 5a and 5b among the central land portions 5a and 5b and the outer land portions 6a and 6b, as described above. If the first circumferential narrow grooves are provided in the outer land portions 6a and 6b, although the relationship with the tire ground contact width is a factor, there is a high probability that the first circumferential narrow groove provided in the outer land portion 6a or 6b will be outside the tire ground contact region when turning on a snowy road surface. In such a case, in the first circumferential narrow groove outside the tire ground contact region in the outer land portion 6a or 6b, if the first side wall, on the side of the outer main groove 4a or 4b, and the tread surface 10 form a large intersection angle $\theta 1$, then snow cannot be sufficiently drawn into the first circumferential narrow groove or packed, making it impossible to form a snow column in the first circumferential narrow groove. This leads to the risk of slipping and also tends to reduce the steering stability due to a reduction in the tire ground contact area when driving straight on a dry road surface. Furthermore, when tires having a tread pattern with the first circumferential narrow grooves provided in the outer land portions 6a and 6b are mounted on the front and rear wheels and the tire applied load differs between the front and rear tires, for example when the tire applied load is higher on the front tires than on the rear tires, the first circumferential narrow grooves in the outer land portions on the front tires tend to be within the tire ground contact region, whereas the first circumferential narrow grooves in the outer land portions on the rear tires tend to be outside of the tire ground contact region. As a result, a difference in grip on a snowy road surface occurs between the front and rear tires, which worsens the front and rear balance and increases the probability of slipping.

Therefore, a particular inventive feature of the present invention is to provide the first circumferential narrow grooves 7a and 7b only in the central land portions 5a and 5b which are always in the tire ground contact region on a snowy road surface, not only when driving straight but also when turning. With this structure, the opening width of the first circumferential narrow grooves 7a and 7b is greater since the intersection angle between the tread surface and the first groove wall of the first circumferential narrow grooves 7a and 7b is increased, thereby making it easier to draw snow into the first circumferential narrow grooves 7a and 7b and to pack the snow drawn into the first circumferential narrow grooves 7a and 7b so as to stably form a snow column, which dramatically enhances on-snow performance even when turning on a snowy road surface. Furthermore, by increasing the intersection angle between the tread surface and the first groove wall of the first circumferential narrow grooves 7a and 7b, the negative ratio increases, but since the intersection angle between the tread surface and the first groove wall is an obtuse angle, the land portion rigidity is increased, so that the steering stability can be maintained without worsening on a dry road surface.

An opening width W7 of the first circumferential narrow grooves 7a and 7b is narrower than an opening width W2 of the central main groove 2, and a groove depth D7 of the first circumferential narrow grooves 7a and 7b is shallower than a groove depth D2 of the central main groove 2. The reason is that if the opening width W7 of the first circumferential narrow grooves 7a and 7b is equivalent to or greater than that of the opening width W2 of the central main groove 2, and/or if the groove depth D7 of the first circumferential narrow grooves 7a and 7b is equivalent to or greater than that of the groove depth D2 of the central main groove 2, then the rigidity of the central land portions 5a and 5b decreases, causing the steering stability to decrease on a dry road surface.

The opening width W7 of the first circumferential narrow grooves 7a and 7b is preferably in a range of 0.2 to 0.5 times the opening width W2 of the central main groove 2, and the groove depth D7 of the first circumferential narrow grooves 7a and 7b is preferably in a range of 0.4 to 0.6 times the groove depth D2 of the central main groove 2.

The intersection angle θ1 between the tread surface 10 and the first groove wall 8 in the first circumferential narrow grooves 7a and 7b is larger than the intersection angle θ2 between the tread surface 10 and the second groove wall 9 on the side of the central main groove 2. The reason is that such intersection angles make it easier to draw snow into the first circumferential narrow grooves 7a and 7b when turning on a snowy road surface.

The intersection angle θ1 between the tread surface 10 and the first groove wall 8 is preferably an obtuse angle in a range of 120° to 150°, and the intersection angle θ2 between the tread surface 10 and the second groove wall 9 is preferably an approximately right angle equal to or less than 95°.

The intersection angle θ1 between the tread surface 10 and the first groove wall 8 is preferably formed by the tread surface 10 and a chamfered cutout portion 12 provided at an opening edge of the first groove wall 8.

Figure 2:
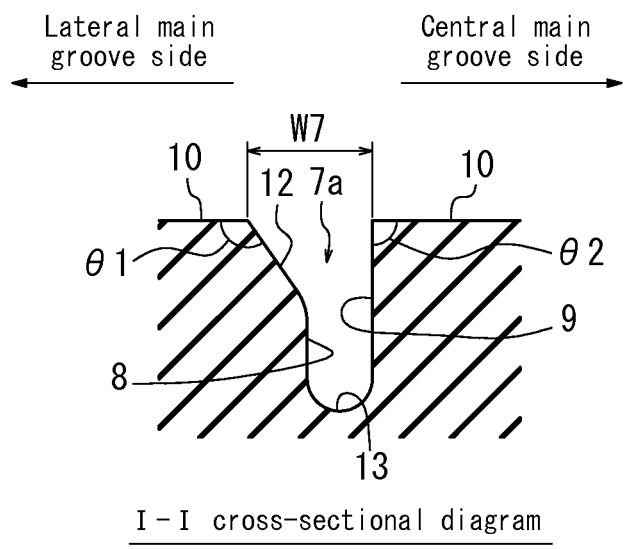
FIG. 2 is a cross-sectional diagram along the line I-I in FIG. 1.
Figure 3:
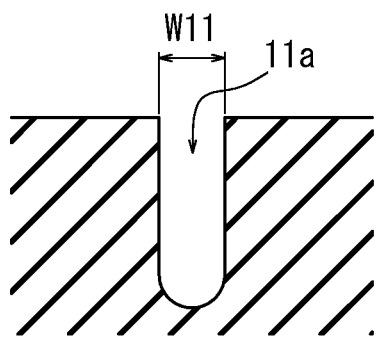
FIG. 3 is a cross-sectional diagram along the line II-II in FIG. 1.
Figure 4:
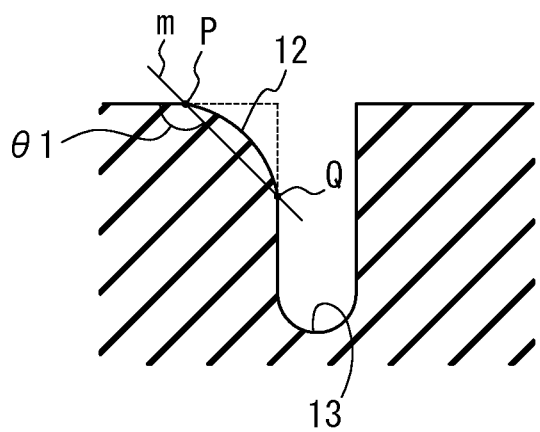
FIG. 4 is a cross-sectional diagram illustrating another embodiment of the cutout portion in FIG. 2.
Figure 5:
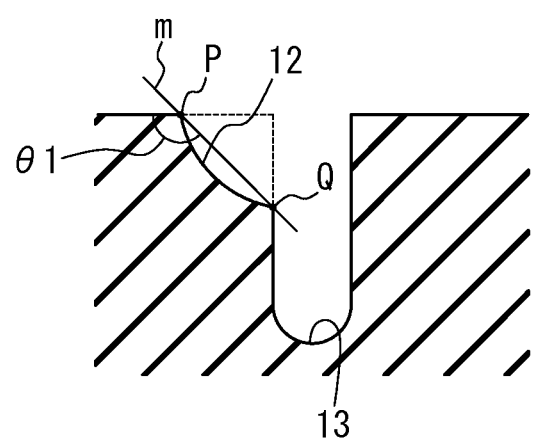
FIG. 5 is a cross-sectional diagram illustrating another embodiment of the cutout portion in FIG. 2.

In addition to being formed by planar chamfering, as illustrated in FIG. 2, the cutout portion 12 may be formed by R-chamfering as a convex surface protruding towards the outside of the tire, as illustrated in FIG. 4, or by C-chamfering as a concave surface receding from the outside of the tire, as illustrated in FIG. 5. Providing such a cutout portion 12 creates a difference in dimensions in the first circumferential narrow grooves 7a and 7b between the opening width and the groove width at the groove bottom, thereby improving packing of snow so as to form a solid snow column. This increases the grip in the outer direction on a snowy road surface.

Note that when the cutout portion 12 is formed by R-chamfering as illustrated in FIG. 4 or by C-chamfering as illustrated in FIG. 5, the intersection angle θ1 between the tread surface 10 and the first groove wall 8 refers to the intersection angle between the tread surface 10 and a line m connecting an inflection point P on the cutout portion 12 at the tread surface 10 and an inflection point Q on the cutout portion 12 at the first groove wall 8 extending from a groove bottom 13.

Furthermore, setting the intersection angle θ1 between the tread surface 10 and the first groove wall 8 to be an obtuse angle and the intersection angle θ2 between the tread surface 10 and the second groove wall 9 to be an approximately right angle makes it easier to collect snow into the first circumferential narrow grooves 7a and 7b from the side of the first groove wall 8 and prevents the collected snow from escaping at the side of the second groove wall 9, thereby allowing for formation of a solid snow column.

In particular, when the groove depth D7 of the first circumferential narrow grooves 7a and 7b is from 40% to 60% of the groove depth D2 of the central main groove 2, optimally 50%, then forming the cutout portion 12 by R-chamfering with a radius of curvature of 1 to 10 mm is preferable in order to facilitate drawing snow into the first circumferential narrow grooves 7a and 7b and to pack the snow thus drawn in so as to form a solid snow column.

Additionally, from the perspective of wet braking performance (drainage performance), second circumferential narrow grooves 11a and 11b are preferably further provided in the outer land portions 6a and 6b, extending in the tire circumferential direction C, having a narrower opening width W4 and a shallower groove depth D4 than those of the outer main grooves 4a and 4b, and having a third groove wall on the side of the outer main grooves 4a and 4b and a fourth groove wall on the side of the central main groove 2 such that respective intersection angles between the tread surface 10 and each of the third groove wall and the fourth groove wall are equivalent.

The above explanation merely provides examples of embodiments of the present invention, and a variety of modifications may be made within the scope of the claims. In the tire having the tread pattern illustrated in FIG. 1, a plurality of sipes 14 and transverse grooves 15 are shown extending in the tire width direction in the central land portions 5a and 5b and the outer land portions 6a and 6b. These sipes 14 and transfers grooves 15 may be provided as necessary.

EXAMPLES

Samples of pneumatic tires according to the present invention were produced and their performance assessed, as described below.

A tire having the tread pattern illustrated in FIG. 1 and a tire size of 185/55R16 was produced with the specifications listed in Table 1 as an Example. Note that a tire according to the present invention has structural features in the tread pattern, whereas the remaining tire structure is similar to a conventional pneumatic tire. For the sake of comparison, a tire having a similar tread pattern as the Example except for not having the cutout portion 12 in the first groove wall of the first circumferential narrow grooves was produced as Comparative Example 1, and a tire having a tread pattern with the first circumferential narrow grooves provided in the outer land portions 6a and 6b instead of the second circumferential narrow grooves was produced as Comparative Example 2. These tires were then assessed.

TABLE 1

| | | Example | Comparative Example 1 | Comparative Example 2 |
|---|---|---|---|---|
| Central main groove 2 | Groove width W2 (mm) | 12 | 12 | 12 |
| | Groove depth D2 (mm) | 7.2 | 7.2 | 7.2 |
| Outer main grooves 4a, 4b | Groove width W4 (mm) | 8.8 | 8.8 | 8.8 |
| | Groove depth D4 (mm) | 7.2 | 7.2 | 7.2 |
| First circumferential narrow | Opening width W7 (mm) | 3.4 | 3.4 | 3.4 |
| | Groove width at groove bottom (mm) | 1.2 | 1.2 | 1.2 |

TABLE 1-continued

|  |  | Example | Comparative Example 1 | Comparative Example 2 |
|---|---|---|---|---|
| grooves 7a, 7b | Groove depth D7 (mm) | 3.3 | 3.3 | 3.3 |
|  | Intersection angle θ1 (°) of first groove wall 8 | 135 | 135 | 135 |
|  | Intersection angle θ2 (°) of second groove wall 9 | 90 | 90 | 90 |
| Cutout portion 12 | Shape | R-chamfering | No chamfering | R-chamfering |
|  | Radius of curvature (mm) | 2.1 |  | 2.1 |
| Second circumferential narrow grooves 11a, 11b | Opening width W11 (mm) | 2.2 | 2.2 | 2.2 |
|  | Groove width at groove bottom (mm) | 2.2 | 2.2 | 2.2 |
|  | Groove depth D11 (mm) | 3.3 | 3.3 | 3.3 |
|  | Intersection angle θ3 (°) of third groove wall 8 | 90 | 90 | 135 |
|  | Intersection angle θ4 (°) of fourth groove wall 9 | 90 | 90 | 90 |

Test Method

Each of the above sample tires was mounted on an applicable rim (rim width: 16×6J), and the land portion rigidity of the tread portion, the braking performance on a dry road surface and a wet road surface, the steering stability on a dry road surface, and the on-snow performance on a snowy road surface were assessed.

The land portion rigidity of the tread portion was determined using the finite element method (FEM) for a land portion block within the tire ground contact area of the tread portion.

The braking performance was assessed based on measurements of the actual vehicle braking distance until a complete stop when traveling at 100 km/h on both a dry road surface and a wet road surface under the following conditions: tire pressure of 230 kPa on the front tires Fr and 220 kPa on the rear tires Rr, and a tire applied load of 800 kgf on the front tires Fr and 540 kgf on the rear tires Rr (with two passengers in the front).

The steering stability on a dry road surface was assessed as the feeling of a professional driver upon driving in various modes on a test course under the following conditions: tire pressure of 230 kPa on the front tires Fr and 220 kPa on the rear tires Rr, and a tire applied load of 800 kgf on the front tires Fr and 540 kgf on the rear tires Rr (with two passengers in the front).

The on-snow performance on a snowy road surface was assessed as the feeling of a professional driver upon driving in various modes on a test course with snow accumulation of 5 to 10 cm (compacted snow) under the following conditions: tire pressure of 230 kPa on the front tires Fr and 220 kPa on the rear tires Rr, and a tire applied load of 800 kgf on the front tires Fr and 540 kgf on the rear tires Rr (with two passengers in the front).

Table 2 lists the assessment results. Note that in Table 2, the values for the land portion rigidity of the tread portion and the braking performance on a dry road surface and a wet road surface are each represented as an index, with Comparative Example 1 as 100. The values for the steering stability on a dry road surface and the on-snow performance on a snowy road surface are assessed with a maximum value of 10. For all values, a larger number indicates better performance.

TABLE 2

|  |  | Example | Comparative Example 1 | Comparative Example 2 |
|---|---|---|---|---|
|  | Land portion rigidity | 100 | 100 | 100 |
| Braking performance | Dry road surface | 100 | 100 | 100 |
|  | Wet road surface | 103 | 100 | 102 |
| Actual vehicle performance | Steering stability on dry road surface | 6.5 | 6.5 | 6.5 |
|  | On-snow performance on snowy road surface | 7.0 | 6.0 | 6.0 |

The results in Table 2 indicate that, as compared to the tires of Comparative Examples 1 and 2, the Example tire has equivalent steering stability on a dry road surface, excellent on-snow performance on a snowy road surface, and excellent braking performance on a wet road surface.

INDUSTRIAL APPLICABILITY

According to the present invention, it is possible to provide a pneumatic tire that has excellent on-snow performance while maintaining good steering stability on a dry road surface by providing optimized first circumferential narrow grooves only in central land portions.

REFERENCE SIGNS LIST

1: Tread portion
2: Central main groove
3a, 3b: Tread end
4a, 4b: Outer main groove
5a, 5b: Central land portion
6a, 6b: Outer land portion 7a, 7b: First circumferential narrow groove
8: First groove wall in first circumferential narrow groove
9: Second groove wall in first circumferential narrow groove
10: Tread surface of tread portion 1
11: Second circumferential narrow groove
12: Cutout portion
13: Groove bottom in first circumferential narrow groove
14: Sipe
15: Transverse groove

The invention claimed is:

1. A pneumatic tire comprising, on a tread surface, one central main groove extending in a tire circumferential direction at a pattern center and a pair of outer main grooves extending in the tire circumferential direction each at a position between the central main groove and a respective tread end, the central main groove and the outer main grooves defining central land portions, and the outer main grooves and the respective tread ends defining outer land portions, wherein among the central land portions and the outer land portions, a first circumferential narrow groove is provided only in the each of the central land portions, extending in the tire circumferential direction, having a narrower opening width and a shallower groove depth than those of the central main groove, and having a first groove wall on the outer main groove side and a second groove wall on the central main groove side such that an intersection angle between the tread surface and the first groove wall is larger than an intersection angle between the tread surface and the second groove wall, both of the first groove wall and the second groove wall of the first circumferential narrow groove extend linearly in the tire circumferential direction, a chamfered cutout portion is provided at an opening edge of the first groove wall, the intersection angle between the tread surface and the chamfered cutout portion is within a range of 120° to 150°, and a chamfered cutout portion is not provided at an opening edge of the second groove wall, and the intersection angle between the tread surface and the second groove wall is equal to or less than 95°.

2. The pneumatic tire according to claim 1, wherein a second circumferential narrow groove is provided in each of the outer land portions, extending in the tire circumferential direction, having a narrower opening width and a shallower groove depth than those of the outer main grooves, and having a third groove wall on the tread end side and a fourth groove wall on the central main groove side such that respective intersection angles between the tread surface and each of the third groove wall and the fourth groove wall are equivalent.

3. The pneumatic tire according to claim 1, wherein only sipes are provided on the land portion on the second groove wall side.

4. The pneumatic tire according to claim 1, wherein only sipes are provided on the land portion defined on the tire equator plane side by the second circumferential groove.

* * * * *